March 21, 1933.   J. L. MATTHEWS   1,902,656
METHOD OF MANUFACTURING GEARING

Original Filed Jan. 7, 1931

INVENTOR
Joseph L. Matthews,
BY Redding, Greeley, O'Shea & Campbell
HIS ATTORNEYS Patented Mar. 21, 1933

1,902,656

UNITED STATES PATENT OFFICE

JOSEPH L. MATTHEWS, OF NEW BRUNSWICK, NEW JERSEY, ASSIGNOR TO INTERNATIONAL MOTOR COMPANY, OF NEW YORK, N. Y., A CORPORATION OF DELAWARE

METHOD OF MANUFACTURING GEARING

Original application filed January 7, 1931, Serial No. 507,086. Divided and this application filed August 11, 1931. Serial No. 556,370.

The present invention relates to steering mechanism and embodies, more specifically, an improved method of forming steering gear sectors and the like where a deformation or other change is required prior to the final hardening thereof.

The present application is a division of the copending application of Joseph L. Matthews for a gear shaping mechanism, Ser. No. 507,086, filed January 7, 1931.

While the following description is made with respect to steering gear sectors, it will be apparent that the invention may be utilized in many other ways, particularly where the desirability of forming an article in the manner described herein is presented.

It has been found in practice that steering gear sectors wear more at the central part thereof than at the ends of the sector, and to compensate for this condition, it has been usual in standard sectors (of the helical worm type) to machine the teeth eccentric to the axis thus producing a high point in the center of the sector and low points adjacent the ends thereof. In this fashion, the teeth of the central part of the sector may be kept closely in mesh with the worm by means of adjustment, even after the central teeth become worn, without danger of binding or tightness at the ends of the sector. With sectors of the side worm type, it is difficult to obtain relief at the ends of the sector during machining since the provision of the above described eccentricity requires extremely difficult machining operations.

A further object of the invention is to provide a method for obtaining relief at the ends of sectors by forming the same in a desired fashion after the teeth have been cut.

Further objects, not specifically enumerated above, will be apparent as the invention is described in greater detail in connection with the accompanying drawing, wherein.

Figure 1:
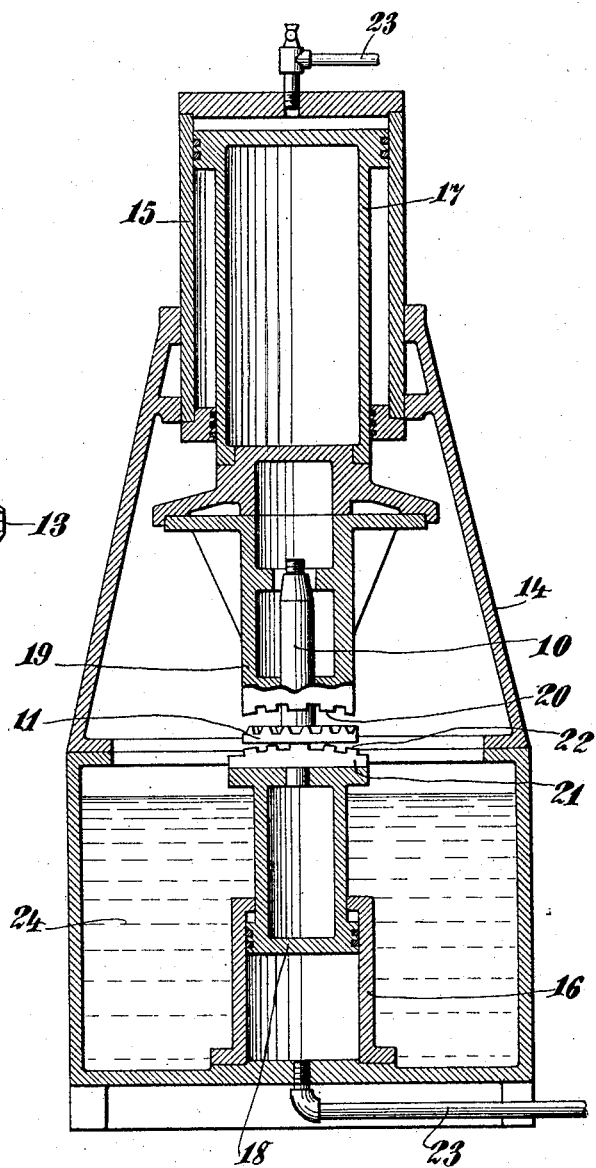
Figure 1 is a sectional view in elevation, showing a quenching press which is adapted to quench and shape an object simultaneously.
Figure 2:
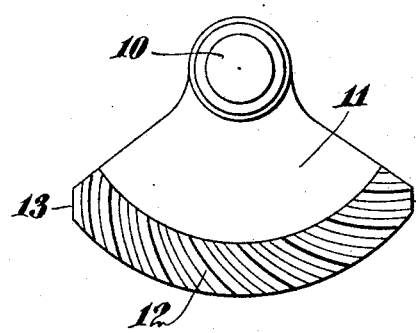
Figure 2 is a view in end elevation showing a sector formed in accordance with the present invention.
Figure 3:
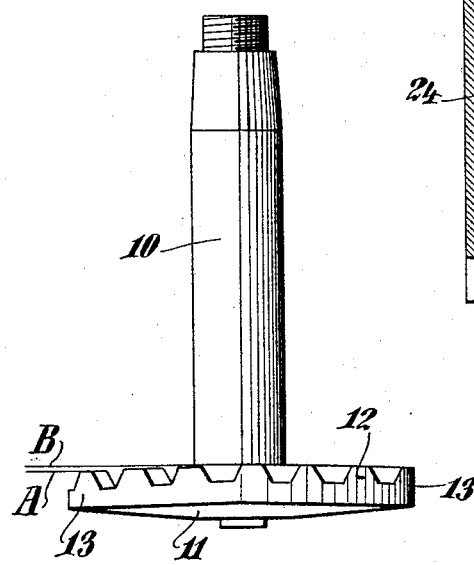
Figure 3 is a view in side elevation, showing the sector of Figure 2.

Referring to the above drawing, particularly to Figures 2 and 3, it will be seen that the sector shaft 10 carries a sector 11, the plane of the teeth of which has been formed to slope away from a central or intermediate high point 12. This plane is indicated by the line A in Figure 3 and the plane of cutting, prior to shaping, is indicated by the line B. The ends 13 of the sector thus lie below the high point 12 and cause the teeth at the high point to engage the worm more closely than the teeth adjacent the low points 13.

After the cutting of the teeth in the normal plane B, the sector is formed in the manner described hereinafter, this step being done any time after cutting whether the sector is hot or cold. The shaping is preferably done at the time of final quenching for hardening the piece and may be done in a press comprising a frame 14 supporting cylinders 15 and 16. A piston 17 is slidably mounted within cylinder 15, while cylinder 18 is carried by the cylinder 16. At the lower end of piston 17, a die 19 is carried, this die being adapted to receive the sector shaft and, on its lower face, being curved, as at 20 to shape the sector suitably during quenching.

Piston 18 carries a cooperating die 21 which is formed with a curved surface 22 similar to the surface 20. Pipes 23 may supply compressed air to the respective cylinders and actuate the dies to shape the sector received therebetween in a desired manner as the sector is submerged in the oil 24.

From the foregoing, it will be seen that the process of shaping the sector, as outlined above, is quite simple and far less expensive and difficult in operation than that of machining the teeth with the desired eccentricity. The shaping process does not add to the manufacturing operations required in making the surface nor does it add materially to the expense of such operations since the standard equipment now available may be used with only the slight alteration of changing the dies of the press.

While the invention has been described with specific reference to the accompanying drawing, it is not to be limited, save as defined in the appended claims.

I claim as my invention:

1. The method of forming gear sectors comprising machining a sector with gear teeth lying at angles to the axis of the sector and subsequently forming certain of the teeth in different planes.

2. The method of forming a gear sector comprising machining a sector with gear teeth lying at angles to the axis of the sector and subsequently applying pressure to the sector to cause certain of the teeth to lie in different planes.

3. The method of forming gear sectors comprising machining a sector with gear teeth lying at angles to the axis of the sector and subsequently heating the sector and applying pressure thereto to cause certain of the teeth to lie in different planes.

4. The method of forming gear sectors comprising machining a sector with gear teeth lying at angles to the axis of the sector and subsequently heating the sector, applying pressure thereto to cause certain of the teeth to lie in different planes, and quenching the sector.

This specification signed this 3rd day of August A. D. 1931.

JOSEPH L. MATTHEWS.